(12) United States Patent
Berg

(10) Patent No.: US 6,511,057 B1
(45) Date of Patent: Jan. 28, 2003

(54) PNEUMATIC SUSPENSION SYSTEM

(75) Inventor: Jürgen Berg, Barsbüttel (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/600,680

(22) PCT Filed: Nov. 3, 1999

(86) PCT No.: PCT/DE99/03503

§ 371 (c)(1),
(2), (4) Date: Jul. 21, 2000

(87) PCT Pub. No.: WO00/32959

PCT Pub. Date: Jun. 8, 2000

(30) Foreign Application Priority Data

Dec. 3, 1998 (DE) .......................... 198 55 814

(51) Int. Cl.⁷ .................................. F16F 9/04
(52) U.S. Cl. ................. 267/64.27; 267/64.21; 267/64.24
(58) Field of Search ............. 267/64.19, 64.27, 267/64.28, 64.26, 122, 64.11, 64.21, 64.23, 64.24

(56) References Cited

U.S. PATENT DOCUMENTS

| | | | |
|---|---|---|---|
| 2,901,242 A | | 8/1959 | Elliott et al. |
| 3,331,601 A | * | 7/1967 | Riehl .......................... 267/64 |
| 5,169,129 A | * | 12/1992 | Hoffman .................. 267/64.27 |
| 5,769,401 A | * | 6/1998 | Pradel ..................... 267/64.26 |
| 5,996,980 A | * | 12/1999 | Frey et al. ................ 267/64.27 |

FOREIGN PATENT DOCUMENTS

| | | |
|---|---|---|
| DE | 2 064 751 | 8/1972 |
| DE | 2722015 A1 * | 11/1978 |
| DE | 36 43 073 | 6/1988 |
| DE | 19508852 C1 * | 8/1996 |
| DE | 197 04 433 | 8/1998 |
| DE | 198 42 733 | 4/1999 |
| EP | 561 394 | 9/1993 |
| GB | 854823 | 11/1960 |
| GB | 1 375 339 | 11/1974 |
| JP | 57129942 A * | 8/1982 |
| WO | WO 98/26947 | 6/1998 |

* cited by examiner

Primary Examiner—Jack Lavinder
Assistant Examiner—Melody M. Burch
(74) Attorney, Agent, or Firm—Collard & Roe, P.C.

(57) ABSTRACT

The invention relates to a pneumatic suspension system (1) comprising at least the following parts: pneumatic suspension bellows (4) made of an elastomer material encompassing a volume-variable air chamber (5); a pneumatic suspension lid (7) to which one end of the pneumatic suspension bellows is fixed by means of a clamping ring (10) or the like; a pneumatic suspension piston (3) to which the other end of the pneumatic suspension bellows (4) is also fixed by means of a clamping ring (10) or the like and on whose outer wall the pneumatic suspension bellows can roll (6) by forming a rolling contour; a wheel guide element (9); a hinge (8) serving as steering means in relation to the wheel guide element (9) and a body (2), wherein the pneumatic suspension parts are disposed in such a way that only one hinge (8) is provided as a steering element in relation to the wheel guide element (9) inside the pneumatic suspension system (1) without requiring any centric restricted guidance. Several advantageous embodiments are disclosed.

5 Claims, 5 Drawing Sheets

PNEUMATIC SUSPENSION SYSTEM

CROSS REFERENCE TO RELATED APPLICATIONS

Applicant claims priority under 35 U.S.C. §119 of German Application No. 198 55 814.7 filed Dec. 3, 1998. Applicant also claims priority under 35 U.S.C. §120 of PCT/DE99/03503 filed Nov. 3, 1999. The international application under PCT article 21(2) was not published in English.

BACKGROUND OF THE INVENTION

DESCRIPTION

1. Field of the Invention

The invention relates to a pneumatic suspension system comprising at least the following pneumatic suspension system components, specifically:

- a pneumatic suspension bellows made of an elastomer material enclosing a volume-variable air chamber;
- a pneumatic suspension lid to which one end of the pneumatic suspension bellows is fixed by means of a clamping ring or the like;
- a pneumatic suspension piston to which the other end of the pneumatic suspension bellows is fixed by means of a clamping ring or the like as well and on whose outer wall the pneumatic suspension bellows can roll off, forming a rolling contour;
- a wheel guide element;
- a hinge serving as the steering means in relation to the wheel guide element; as well as
- a body.

2. The Prior Art

With pneumatic suspension systems without a damper disposed on the inside, the pneumatic suspension lid is secured on the body and the pneumatic suspension piston on a wheel guide element. In the presence of spring action, the piston is then moving in relation to the lid according to the wheel guide kinematics, whereby it is not assured that the pneumatic suspension bellows rolls off on the piston in a symmetric manner.

Now a pneumatic suspension system of this type is disclosed in laid-open patent specification DE 197 04 433 A1, where the problem of relative movements between the components of the pneumatic suspension system is solved by means of an inner guide in the form of centric forced guidance. In this system, a hinge is in connection with the body and another hinge with the wheel guide element. The two hinges are connected with each other by means of the inner guide, which preferably is a guiding cylinder-and-push rod device. Since the inner guide is not intended to assume any damping properties, the pneumatic suspension system has to be separately provided with a damper. The friction occurring on the inner guide in the presence of spring action, in particular with maximum spring action to the limit of suspension, then leads to a deterioration of the pneumatic suspension system in relation to the vehicle.

Now, the problem of the invention is to provide a pneumatic suspension system without a damper disposed on the inside, in which system the wheel guide kinematics in relation to symmetric roll-off of the pneumatic suspension bellows is realized without inside guide elements influencing the comfort.

SUMMARY OF THE INVENTION

The problem is solved by the invention in that the components of the pneumatic suspension system are arranged in a such a way that only one single hinge is present within the pneumatic suspension system as the steering means in relation to the wheel guide element, with omission of centric forced guidance.

Advantageous design variations are explained in the following in greater detail.

Variation A

According to this variation, which within the framework of the concept as defined by the invention contains a particularly advantageous embodiment of the invention, the pneumatic suspension piston as the upper component is tied to the body, whereby the rolling fold of the pneumatic suspension bellows is bulging upwards. The pneumatic suspension lid as the lower component is connected with the hinge within the bottom of the lid, specifically with centric tie-up of the pneumatic suspension lid to the wheel guide element by means of the hinge.

Variation B

According to this variation, the pneumatic suspension lid as the upper component is tied to the body, whereas the pneumatic suspension piston as the lower component is connected with the hinge, whereby the hinge is located within the piston chamber and/or air chamber, specifically with centric tie-up of the pneumatic suspension piston to the wheel guide element by means of a rod extending within the piston.

Variation C

According to this variation, the pneumatic suspension lid as the upper component is tied to the body, whereas the pneumatic suspension piston as the lower component is connected with the hinge within the bottom of the piston, specifically with centric tie-up of the pneumatic suspension piston to the wheel guide element by means of the hinge. The angle of movement of the hinge is reduced in this connection in such a way that the piston is prevented from tilting in the presence of kinematic spring action.

Variation D

According to this variation, the pneumatic suspension lid as the upper component is connected with the hinge, specifically with centric tie-up of the pneumatic suspension lid to the body by means of the hinge. The pneumatic suspension piston as the lower component is centrically tied to the wheel guide element within the bottom of the piston.

Further advantageous design variations are discussed below, whereby particularly in conjunction with variation A, the pneumatic suspension system is additionally equipped with a protective bellows and/or a supporting ring.

Furthermore, it is advantageous in connection with variation A if the hinge is designed in the form of a bush-like component comprising a tubular core, a cushion made of elastomer material, and an outer sleeve.

The pneumatic suspension bellows is provided with a reinforcing insert in most cases (DE 36 43 073 A1).

Furthermore, the air chamber may be connectable via a channel with an additional air volume for increasing the comfort of the pneumatic suspension system (DE 197 04 433 A1).

BRIEF DESCRIPTION OF THE DRAWINGS

The invention is explained in the following with the help of exemplified embodiments and by reference to schematic drawings, in which.

Figure 1:
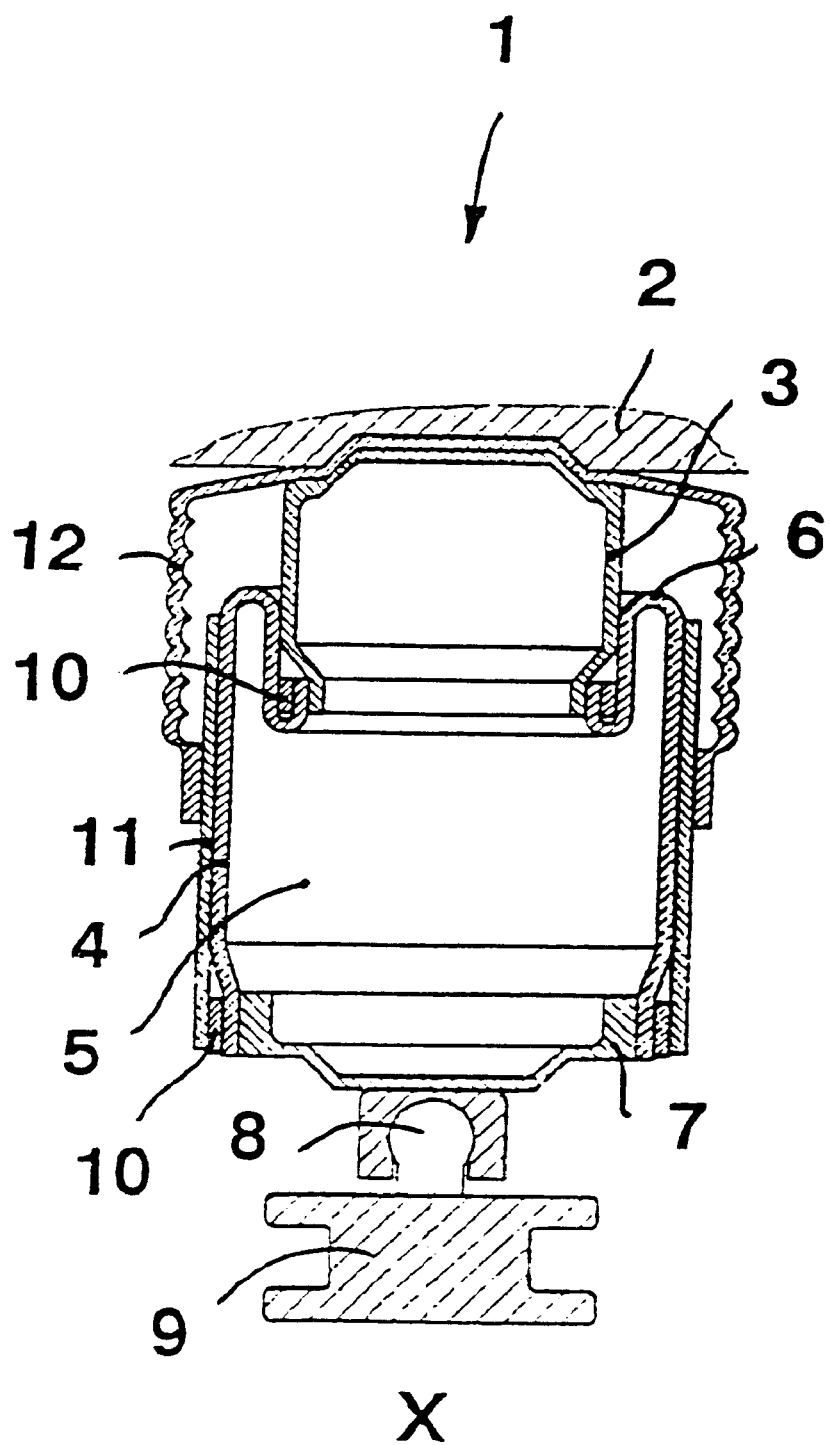
FIG. 1 shows a pneumatic suspension system according to variation A.

The following list of reference numerals and symbols is applicable in connection with said figures:

| | |
|---|---|
| 1, 1', 1", 1'", 1"" | Pneumatic suspension system |
| 2, 2', 2", 2'" | Body |
| 3, 3', 3", 3'" | Pneumatic suspension piston (roll-off piston) |
| 4, 4', 4", 4'". 4"" | Pneumatic suspension bellows |
| 5, 5', 5", 5'" | Air chamber |
| 6, 6', 6", 6'" | Rolling fold |
| 7, 7', 7", 7'", 7"" | Pneumatic suspension lid |
| 8, 8', 8", 8'" | Hinge |
| 9, 9', 9", 9'" | Wheel guide element |
| 10 | Clamping ring |
| 11 | Outer guide |
| 12 | Protective bellows |
| 13 | Piston chamber |
| 14 | Rod |
| 15 | Bush-like component |
| 16 | Core |
| 17 | Cushion made of elastomer material |
| 18 | Outer sleeve |
| 19 | Supporting ring |

DETAILED DESCRIPTION OF THE PREFERRED EMBODIMENTS

FIG. 1 shows a pneumatic suspension system 1 in which the pneumatic suspension piston 3 as the upper component is tied to the body 2, whereby the rolling fold 6 of the pneumatic suspension bellows 4 is bulging upwards. In the present embodiment, the pneumatic suspension bellows made of elastomer material encloses an air chamber 5 with a variable volume.

The pneumatic suspension lid 7 as the lower component is connected within the bottom of the lid with the hinge 8 (ball joint), specifically with centric tie-up (i.e. with respect to the center plane X) of the pneumatic suspension lid to the wheel guide element 9 by means of the hinge.

Furthermore, the pneumatic suspension system 1 is equipped with a protective bellows 12 made of elastomer material or TPE (thermoplastic elastomer), with the lower part of the protective bellows being secured on the outer guide 11. It may be fastened there in a rigid or a flexible manner.

Figure 2:
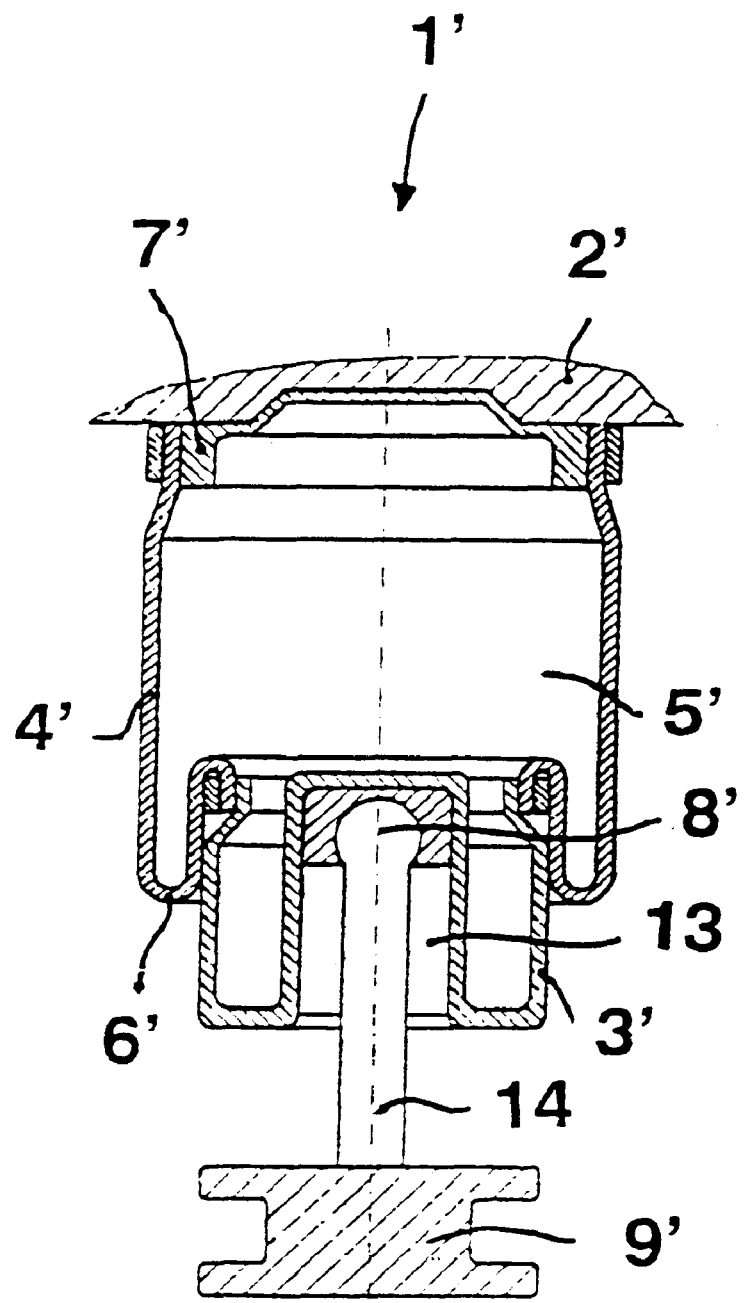
FIG. 2 shows a pneumatic suspension system according to variation B.

In the pneumatic suspension system 1' according to FIG. 2, the pneumatic suspension lid 7' as the upper component may be tied to the body 2'.

The pneumatic suspension piston 3' as the lower component is connected with the hinge 8' (ball joint), whereby the hinge is located within the piston chamber 13, also in the present case specifically with centric tie-up of the pneumatic suspension piston to the wheel guide element 9' by means of a rod 14 extending within the piston.

Figure 3:
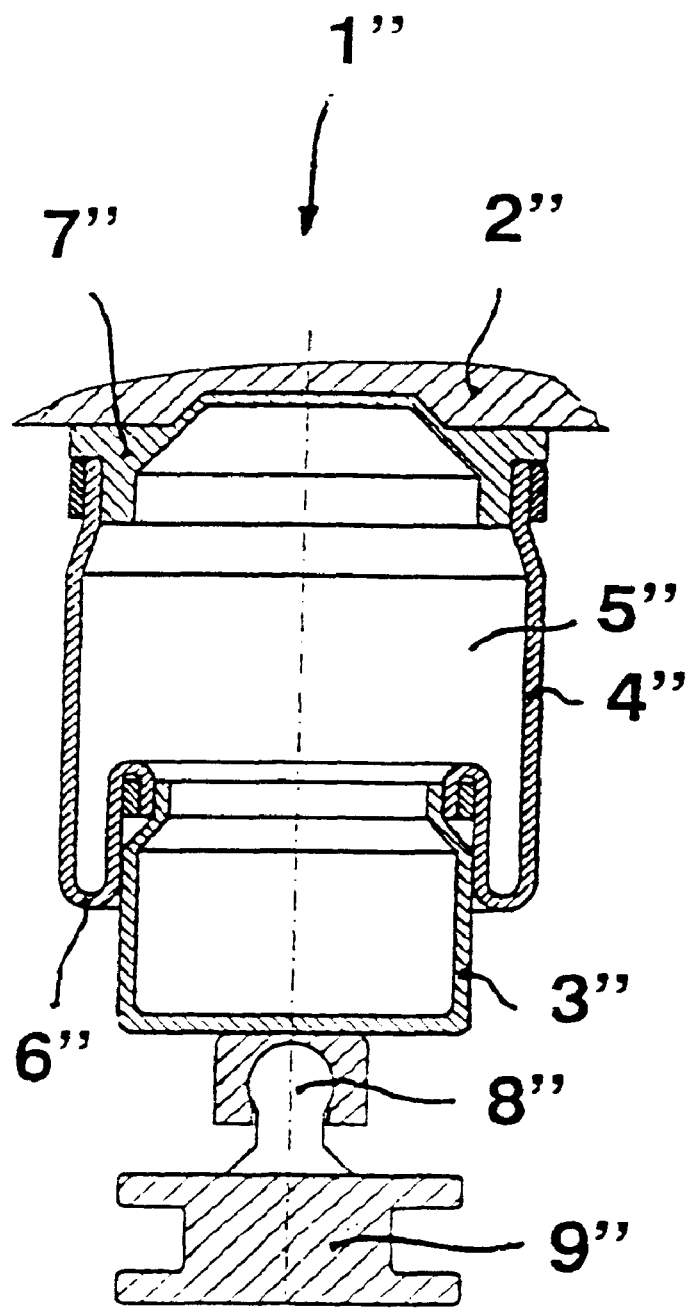
FIG. 3 shows a pneumatic suspension system according to variation C.

FIG. 3 shows a pneumatic suspension system 1", in which, like in the exemplified embodiment according to FIG. 2, the pneumatic suspension lid 7" as the upper component is tied to the body 2".

The pneumatic suspension piston 3" as the lower component is connected within the head of the piston with the hinge 8" (ball joint), also in the present embodiment specifically with centric tie-up of the pneumatic suspension piston to the wheel guide element 9" by means of the hinge.

Figure 4:
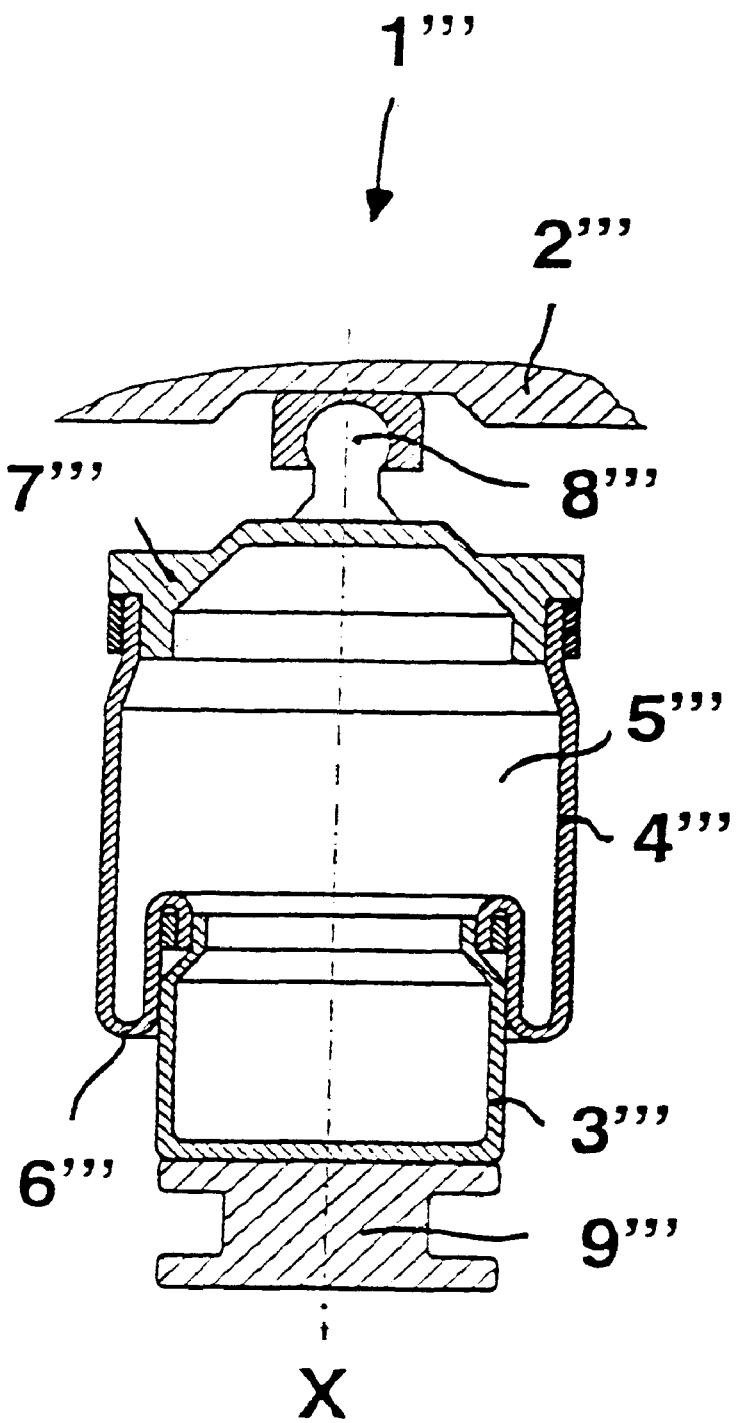
FIG. 4 shows a pneumatic suspension system according to variation D.

In the pneumatic suspension system 1'" according to FIG. 4, the pneumatic suspension lid 7'" as the upper component is connected with the hinge 8'" (ball joint), specifically with centric tie-up (i.e. with respect to the center plane X) of the pneumatic suspension lid to the body 2'" by means of the hinge.

The pneumatic suspension piston 3'" as the upper component is centrically tied to the wheel guide element 9'".

Figure 5:
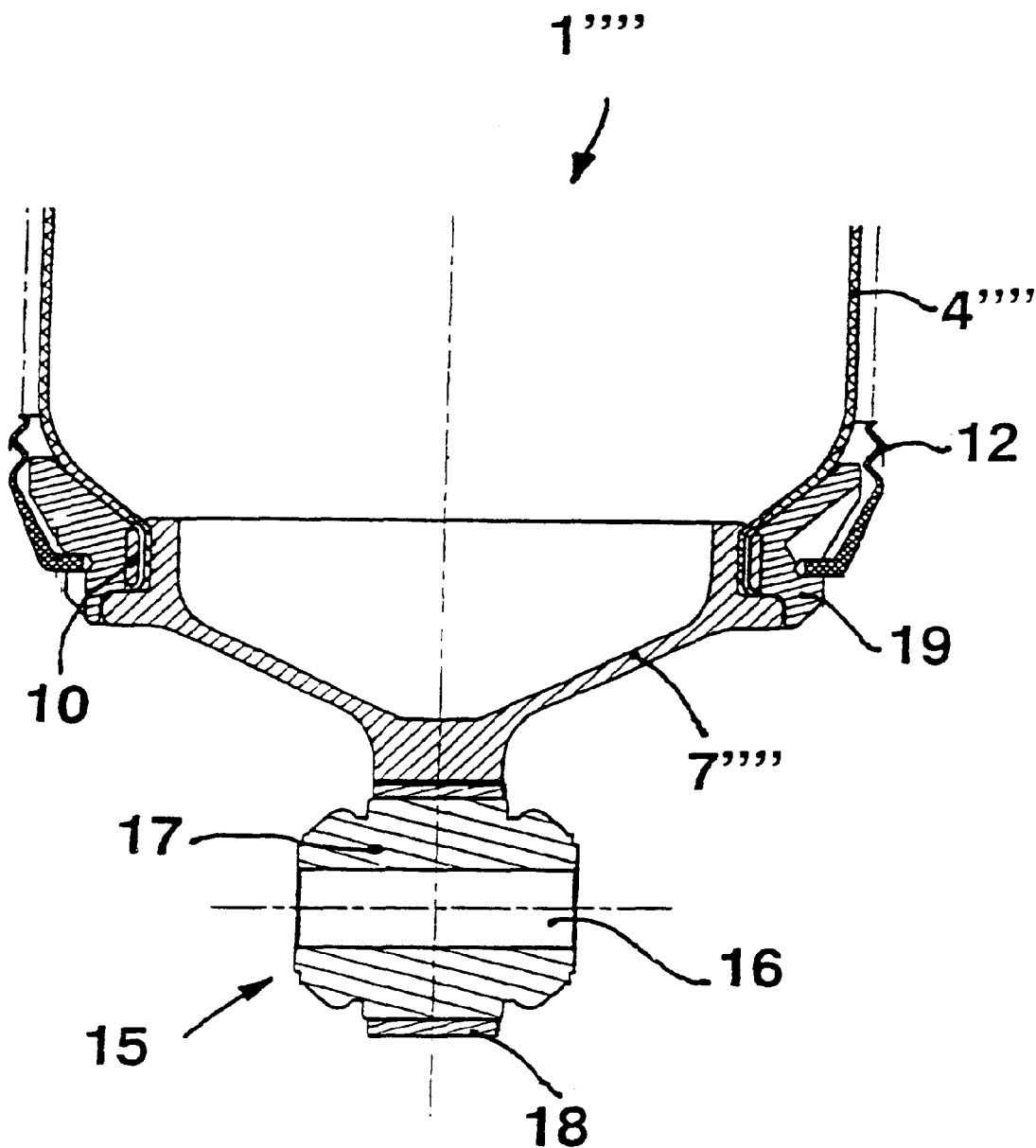
FIG. 5 shows another pneumatic suspension system according to variation A.

FIG. 5 shows a pneumatic suspension system 1"" with the basic structure according to FIG. 1.

The pneumatic suspension lid 7"" as the lower component is connected within the bottom of the lid with the hinge. In the present embodiment, the hinge is realized in the form of a bush-like component or jacket 15 comprising a core 16, a cushion 17 made of elastomer material, and an outer sleeve 18. The core itself is connected with the wheel guide element.

The pneumatic suspension system 1"" (in the present case without the outer guide) is equipped with a supporting ring 19 for the pneumatic suspension bellows 4"", namely in the location where the pneumatic suspension bellows is secured on the pneumatic suspension lid by means of the clamping ring 10.

In the present embodiment, the lower part of the protective bellows 12 is secured on the supporting ring 19.

What is claimed is:

1. A pneumatic suspension system for supporting a body comprising:
   (a) an upper component comprising a pneumatic suspension piston adapted for mounting to the body;
   (b) a pneumatic suspension bellows secured to said pneumatic suspension piston and forming an upwards rolling fold when said pneumatic suspension bellows rolls off an outer surface of said pneumatic suspension piston;
   (c) a lower component comprising a pneumatic suspension lid secured to one end of said pneumatic suspension bellows;
   (d) a single hinge disposed adjacent to and directly connected to said pneumatic suspension lid;
   (e) a wheel guide element connected to said hinge, a bottom portion of said pneumatic suspension lid being centrally connected to said wheel guide element by means of said hinge, said hinge serving as a steering means in relation to the wheel guide element without requiring centric forced guidance.

2. The pneumatic suspension system according to claim 1, wherein the hinge is designed in the form of a ball joint, or a jacket, said jacket comprising a core, a cushion made of elastomeric material, and an outer sleeve.

3. The pneumatic suspension system according to claim 1, wherein the pneumatic suspension bellows is provided with an outer guide, whereby the outer guide is rigidly or flexibly secured on the pneumatic suspension system.

4. The pneumatic suspension system according to claim 1, wherein said system is equipped with a protective bellows made of an elastomeric material or a thermoplastic elastomer, said protective bellows being secured on the pneumatic suspension bellows or on another pneumatic suspension component.

5. The pneumatic suspension system according to claim 1, wherein said system is equipped with a supporting ring for the pneumatic suspension bellows.

* * * * *